(12) United States Patent
Citro

(10) Patent No.: US 8,149,926 B2
(45) Date of Patent: Apr. 3, 2012

(54) GENERATING EDGE MASKS FOR A DEBLOCKING FILTER

(75) Inventor: Ricardo Citro, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1708 days.

(21) Appl. No.: 11/103,391

(22) Filed: Apr. 11, 2005

(65) Prior Publication Data
US 2006/0227883 A1 Oct. 12, 2006

(51) Int. Cl.
*H04N 7/12* (2006.01)
*G06K 9/40* (2006.01)

(52) U.S. Cl. .................... 375/240.29; 382/260

(58) Field of Classification Search ............ 375/240.29; 382/260
See application file for complete search history.

(56) References Cited

U.S. PATENT DOCUMENTS

| 5,706,126 | A | 1/1998 | Fujita |
| 7,535,961 | B2 * | 5/2009 | Cho et al. ............ 375/240.12 |
| 2003/0128213 | A1 * | 7/2003 | Jun et al. ............ 345/441 |
| 2004/0101059 | A1 | 5/2004 | Joch |
| 2005/0013494 | A1 | 1/2005 | Srinivasan |
| 2005/0053302 | A1 * | 3/2005 | Srinivasan et al. ........ 382/248 |
| 2006/0104349 | A1 * | 5/2006 | Joch et al. ............ 375/240.03 |

FOREIGN PATENT DOCUMENTS

| JP | 09148887 | 11/1995 |
| JP | 10290368 | 10/1998 |
| WO | PCT/US2006/013801 | 7/2006 |

* cited by examiner

*Primary Examiner* — Jay Au Patel
*Assistant Examiner* — Richard Torrente
(74) *Attorney, Agent, or Firm* — Trop, Pruner & Hu, P.C.

(57) ABSTRACT

A deblocking unit may include a buffer, an edge mask generator, and a deblocking filter. The buffer may store video data including blocks. The blocks may correspond to at least a portion of a macroblock. The edge mask generator may generate a particular edge mask that defines edges between blocks to be deblocked. The edge mask generator may include an edge mask memory to store a number edge masks and logic to choose the particular edge mask among the number of edge masks. The logic may choose based on a type of the video data in the buffer and a position offset of the macroblock. The deblocking filter may deblock edges between blocks of video data in the buffer based on the particular edge mask from the edge mask generator.

10 Claims, 6 Drawing Sheets

| Position | Hex value |
|---|---|
| Top-Left | 0x0003 |
| Top-Inner | 0x0002 |
| Top-Right | 0x0006 |
| Inner-Left | 0x0009 |
| Inner-Inner | 0x0008 |
| Inner-Right | 0x000C |
| Bottom-left | 0x0001 |
| Bottom-Inner | 0x0004 |
| Bottom-Right | 0x0000 |

GENERATING EDGE MASKS FOR A DEBLOCKING FILTER

BACKGROUND

Implementations of the claimed invention generally may relate to schemes for encoding and/or decoding video information and, more particularly, to such schemes that employ deblocking filters in their video processing.

Video information may be organized within a frame or other video object (e.g., a video object plane (VOP)) in blocks. In some video encoding/decoding schemes, a block may include a (2×2, 4×4, 8×8, etc.) group of, for example, luma (i.e., Y) pixels. Similar data organization may also be reflected in chroma (i.e., U/V, or Cr/Cb) pixels. Blocks of luma and chroma video information may be further grouped into so-called macroblocks in some schemes. It should be noted, however, that the above sizes of blocks and macroblocks are purely exemplary, and other sizes and numbers may also be employed in various video encoding/decoding schemes.

Certain video encoding/decoding schemes may employ deblocking filters to smooth edges between adjacent blocks. Such deblocking filters may improve the appearance of decoded video data and may improve compression performance for encoded video data. Such filtering may be applied to vertical and/or horizontal edges of adjacent blocks of luma and/or chroma components. Some video schemes that employ deblocking filters may include, but are not limited to, Advanced Video Coding (AVC) (e.g., MPEG-4, part 10 and ITU-T Recommendation H.264), Windows Media Video 9 (WMV-9), and/or SMPTE's VC-1.

For some macroblocks, however, a deblocking filter may not operate on all possible vertical and horizontal edges within a macroblock. In such cases, an edge mask may be used to specify exactly which vertical edges and which horizontal edges will be filtered. Generating such edge masks for different macroblocks (or portions of macroblocks) may consume an undesirably long amount of time in a given decoding and/or encoding process.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
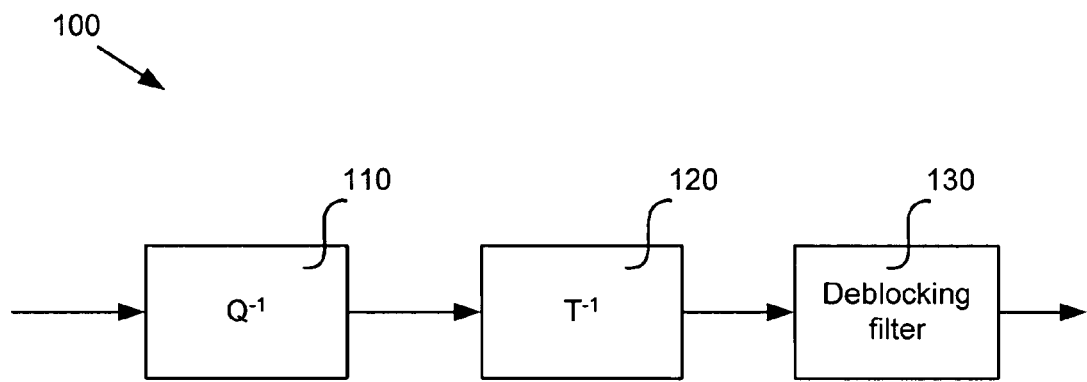
FIG. 1 illustrates a portion of a video coding system.

FIG. 1 illustrates a portion of a video coding system 100. System 100 may include a decoder or an encoder, either of which may include other portions that are not, for clarity of explanation, illustrated in FIG. 1. For example, the portion of system 100 shown may be located in a decoder after entropy decoding and reordering, or it may be located in the reconstruction path of an encoder.

The portion of system 100 shown in FIG. 1 may include an inverse quantizer ($Q^{-1}$) 110, an inverse transformer ($T^{-1}$) 120, and a deblocking filter 130. Inverse quantizer 110 may scale coefficients. This scaling may be performed either after quantizing in an encoder or after entropy decoding and reordering in a decoder.

Inverse transformer 120 may perform an inverse transform on the scaled coefficients output by inverse quantizer 110. In some implementations, inverse transformer 120 may perform an inverse discrete cosine transform (IDCT). In some implementations, however, inverse transformer 120 may perform another inverse transformation, such as an inverse Hadamard transform, an inverse wavelet transform, or other now-known or later-developed inverse transform. Inverse transformer 120 may produce reconstructed blocks of video data or difference blocks that may be added to predicted blocks (not shown) to produce reconstructed blocks of video data. Either way, inverse transformer 120 may output reconstructed blocks (and hence macroblocks) of data for deblocking filter 130 to operate on.

Deblocking filter 130 may operate on blocks in a macroblock of video data. Deblocking filter 130 may apply filtering to vertical and/or horizontal edges between blocks in a macroblock. Although deblocking filter 130 may operate to smooth edges between blocks in a macroblock, it need not necessarily operate on exactly one macroblock's worth of blocks. For example, deblocking filter 130 may act on a collection of blocks that is larger than a macroblock, or on a collection of blocks that is smaller than a macroblock.

Figure 2:
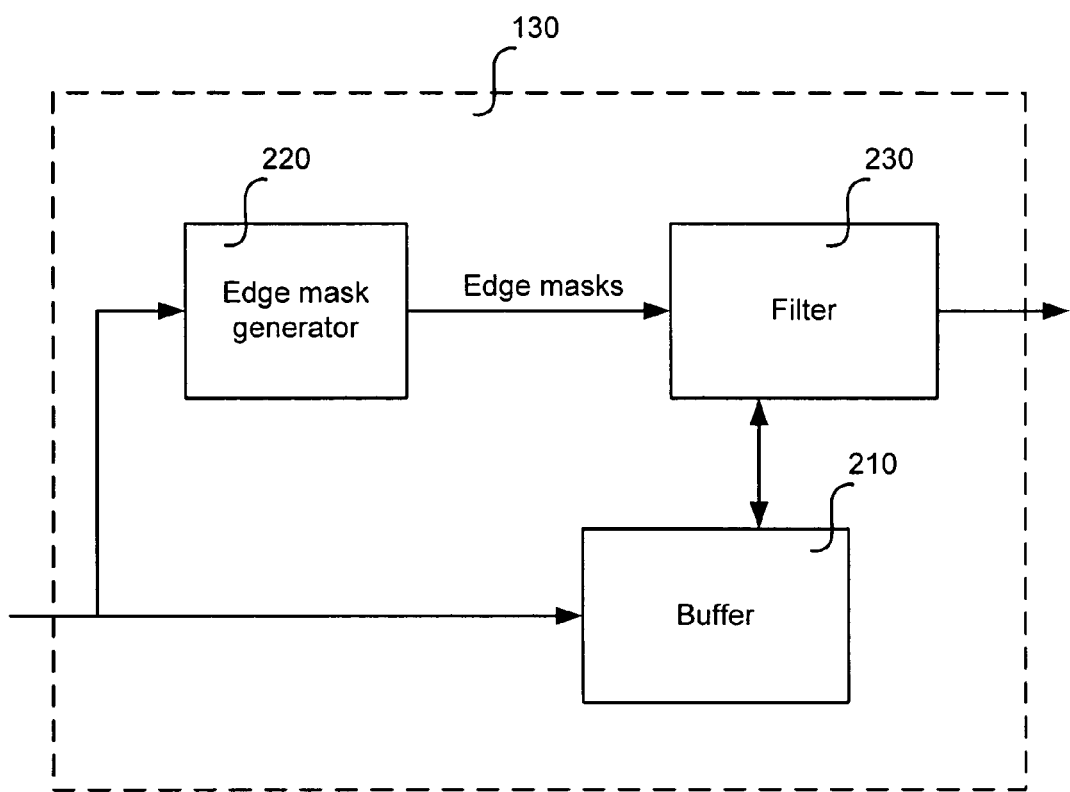
FIG. 2 illustrates an exemplary deblocking filter in the system of FIG. 1.

FIG. 2 illustrates an implementation of deblocking filter 130. Deblocking filter 130 may include a buffer 210, an edge mask generator 220, and a filter portion 230. Although illustrated as being connected in a certain manner for ease of illustration, deblocking filter 130 in FIG. 2 may be connected in other configurations. For example, filtered video data may be output directly from buffer 210, instead of via filter 230 as shown. Other variations are both possible and contemplated.

Buffer 210 may include a memory to store a number of blocks of video data while (e.g., before, during, etc.) edge filtering is being performed. Buffer 210 may include, for example, synchronous or asynchronous random access memory (RAM). In some implementations, buffer 210 may be sized to accommodate about a macroblock (e.g., 8×8, 4×8, 8×4, 4×4 blocks) of video data. In some implementations, buffer 210 may be sized to accommodate more than a macroblock of video data. For example, buffer 210 may also include space to store one or more blocks that are adjacent to a macroblock, such as a 6×6 block arrangement that will be described in greater detail below with regard to FIGS. 3A and 3B. In some implementations, buffer 210 may accommodate yet more data, such as two or more macroblocks.

Edge mask generator 220 may be arranged to generate an edge mask that defines particular edges within the blocks in buffer 210 to be deblock-filtered by filter portion 230. Edge mask generator 220 may generate an edge mask that corresponds to the number of blocks in buffer 210, although not all possible edges may be filtered due to bandwidth and/or other processing constraints of filter portion 230. For example, in some implementations edge mask generator 220 may generate a mask for (e.g., direct the filtering of) as many as 6 horizontal edges and/or as many as 6 vertical edges for a given amount of data in buffer 210. Fewer or greater numbers of horizontal and vertical edges identified for deblocking in a mask, however, are possible. These concepts will be explained in greater detail with regard to FIGS. 3A and 3B.

Figure 3A:
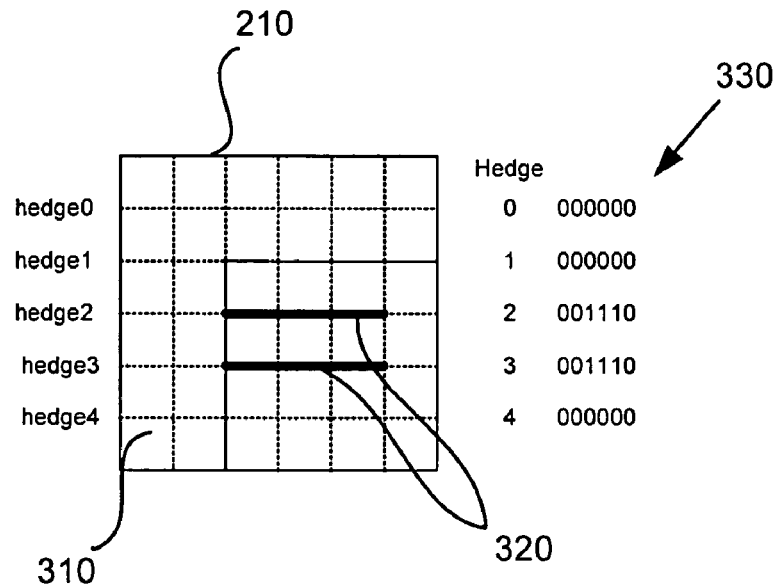
FIGS. 3A and 3B conceptually illustrate exemplary data buffers and edge masks.
Figure 3B:
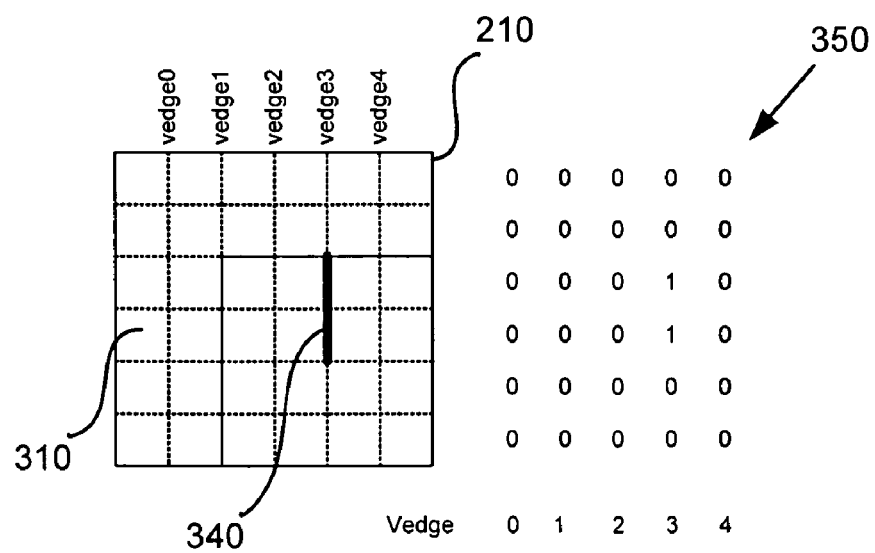

FIG. 3A conceptually illustrates an exemplary data buffer 210 including blocks 310 and horizontal edges 320 to be filtered, as well as a corresponding horizontal edge mask 330. For ease of explanation, FIG. 3A illustrates horizontal edges to be filtered for buffer 210, and FIG. 3B illustrates vertical edges for the same data in buffer. In the example shown in FIGS. 3A and 3B, buffer 210 may include 6×6 blocks 310 of video data. Also, within the 6×6 blocks, a macroblock may be located in the bottom-most and right-most 4×4 blocks of buffer 210, although other locations of a macroblock within buffer 210 are possible.

As shown, the 6×6 blocks in buffer 210 may include 5 sets of horizontal edges among blocks (e.g., hedge0 through hedge 4) and 5 sets of vertical edges among blocks (e.g., vedge0 through vedge 4). In FIG. 3A, the 6 horizontal edges 320 to be filtered (e.g., "deblocked") are illustrated in bold relative to the other horizontal edges. The horizontal edges in FIG. 3A that are not to be filtered are shown, but not bolded.

Horizontal edge mask 330 corresponds to the designated edges within buffer 210 in FIG. 3A. The size of mask 330 (e.g., 5×5) represents the total number of horizontal edges among the 6×6 blocks in buffer 210. The edges in mask 330 to be filtered are illustrated as "1" while the edges not to be filtered are illustrated as "0." Although edge mask 330 may be represented as shown (e.g., as five groups of zeros and ones), it may also be presented in a more compact format, such as a word or two of hexadecimal characters. Such characters may denote which edge rows, and which positions/edges within those rows, are to be deblocked via filter 230.

FIG. 3B conceptually illustrates an exemplary data buffer 210 including blocks 310 and vertical edges 340 to be filtered, as well as a corresponding vertical edge mask 350. In contrast to the six horizontal edges 320 in FIG. 3A, only two vertical edges 340 to be filtered are present in FIG. 3B. These vertical edges 340 to be filtered are denoted in vertical edge mask 350 as "1," where the vertical edges that will not be filtered are denoted by "0."

Although edge masks 330 and 350 have been presented separately in FIGS. 3A and 3B, these need not necessarily be separate in implementation. For example, a combined edge mask including both horizontal and vertical edges to be filtered may be used. In some implementations, however, separate horizontal masks 330 and vertical masks 350 may be output from edge mask generator 220 to filter portion 230. Such segmentation may allow, for example, all horizontal edges to be filtered 320 or all vertical edges to be filtered 340 to be represented in a single word, permitting a complete edge mask to be transmitted to filter portion 230 in two words.

Figure 4:
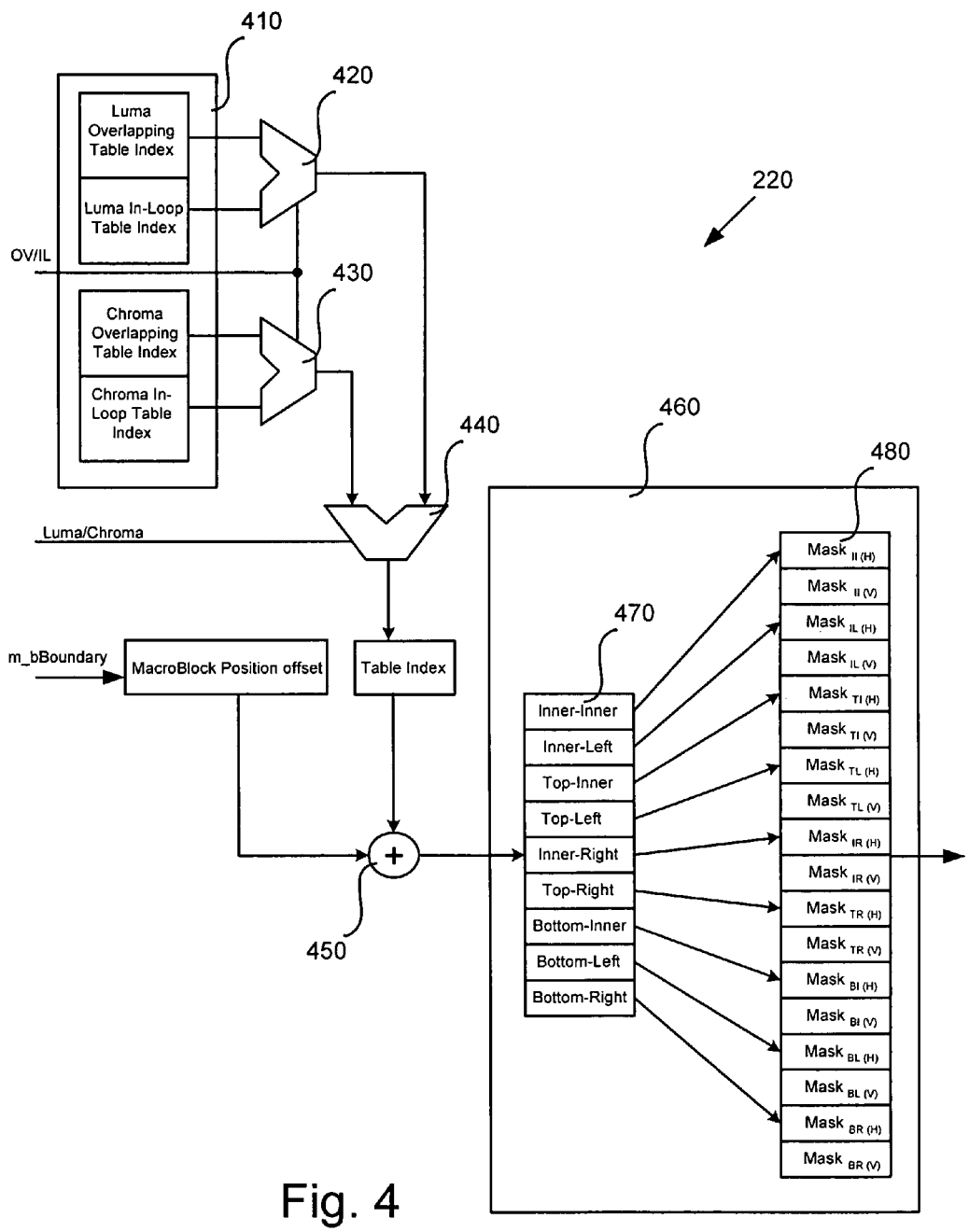
FIG. 4 illustrates an exemplary edge mask generator in the filter of FIG. 2.

FIG. 4 illustrates one implementation of edge mask generator 220. Generator 220 in FIG. 4 may generate edge masks based on three criteria: 1) whether the video data is luma or chroma-type data, 2) whether overlapping or in-loop filtering is desired, and 3) the position of the associated macroblock within its video object. These criteria will be further explained below. Edge mask generator 220 may include an index memory 410, multiplexers 420-440, a combiner 450, and a mask memory 460.

Index memory 410 may include storage elements such as read-only memory (ROM) or RAM to store a number of indices. As illustrated, index memory 410 may store a luma overlapping (OV) table index, a luma in-loop (IL) table index, a chroma overlapping table index, and a chroma in-loop table index. The indices in index memory 410 may be conceptualized as the number of sets of distinct edge mask categories. In the generator 220 of FIG. 4, there may be four categories of edge masks selected based on the indices in index memory 410, but this number may be lesser or greater in other implementations.

Multiplexers 420-440 may select, on the basis of the OV/IL and luma/chroma selection lines, one of the indices from index memory 410. Multiplexers 420 and 430 select the appropriate luma and chroma indices based on whether IL or OV filtering is specified. Such filtering may be specified by parameters in the video data in buffer 210, such as an INLOOP and/or OVERLAP flag in a sequence layer of the data. Multiplexer 440 may select between these luma and chroma indices based on whether the video data in buffer 210 is luma data or chroma data. In some implementations, the OV/IL and luma/chroma selection lines may be swapped along with the inputs to multiplexers 420 and 430 to produce the same output from multiplexer 440.

The "table index" output by multiplexer 440 may be used to select a certain table in mask memory 460. As will be explained, the "macroblock position offset" in FIG. 4 may be used to select a certain entry in the table specified by the table index from multiplexer 440. The macroblock position offset will be further explained with regard to FIGS. 5A and 5B.

Figures 5A, 5B:
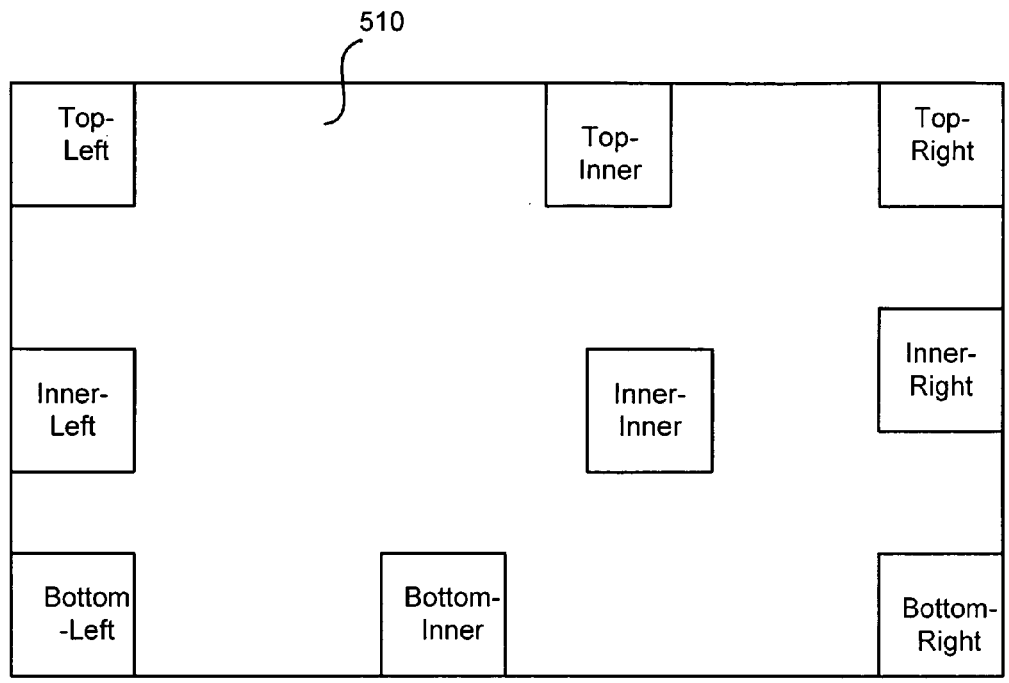
FIGS. 5A and 5B illustrate macroblock position offsets.

FIGS. 5A and 5B illustrate macroblock position offsets. Macroblocks may be processed by deblocking filter 130 in order of arrival, for example, $MB_0$, $MB_1$, ..., $MB_{n-1}$ where n=total number of macro-blocks in a video object (e.g., a frame). Each macroblock may be located at one of nine general locations in the object/frame, and such location may be defined by a macro-block header parameter field in the video data.

FIG. 5A illustrates a frame 510 of video data, and the nine possible locations of a macroblock within frame 510. Four of these locations may be in the "corners" of frame 510, where a macroblock borders two boundaries of frame 510. These locations may be denoted as "top-left," "top-right," "bottom-left," and "bottom-right" as shown. Four of these locations may be along boundaries of frame 510 excluding the corners, where a macroblock borders only one boundary of frame 510. These locations may be denoted as "top-inner," "inner-right," "bottom-inner," and "inner-left" as shown. A macroblock that does not border any boundary of frame 510 may be classified as "inner-inner."

FIG. 5B illustrates a table 520 of macroblock positions/locations and corresponding hexadecimal values. These hexadecimal values may be found in the header information of a macroblock. For example, the particular values in table 520 may be found in the m_bBoundary field in macroblocks of video data encoded in the VC1 scheme. Similar position values, however, may be found in macroblocks encoded consistent with other video encoding schemes. These position values in table 520 may be used for the macroblock position offset in edge mask generator 220 in FIG. 4.

Returning to FIG. 4, combiner 450 may combine the macroblock position offset with the table index to output a resulting index value. In some implementations, combiner 450 may include an adder to add the macroblock position offset to the table index. In some implementations, combiner 450 may include other logic to arithmetically (e.g., substracter, etc.) and/or logically combine (e.g., AND, XOR, etc.) the macroblock position offset and the table index as appropriate. The resulting index value may point to a location in mask memory 460.

Mask memory 460 may include storage elements, such as ROM or RAM or any type of gate-based storage, suitable for storing, for example, an index table 470 and a mask table 480. Index table 470 may be indexed by the resulting index value from combiner 450. Although for ease of explanation, only one index table 470 is shown in FIG. 4, it should be noted that this table corresponds to the table index that is output by multiplexer 440. In practice, the number of index tables 470 may correspond to the number of table indices in index memory 410 (e.g., four).

The macroblock position offset that is combined with the table index may determine which entry in index table 470 is selected by the resulting index value. For example, if the macroblock index value indicates that the macroblock in question is an inner-left macroblock, the resulting index value may index the "inner-left" entry in table 470. Such entry in index table 470 may contain a pointer or index to mask table 480.

Mask table 480 may correspond to a given index table 470 (e.g., there may also be multiple such tables as explained above) and may include corresponding horizontal and vertical edge masks to be used by filter portion 230 of deblocking filter 130. For example, the "inner-left" entry in index table 470 may point to $Mask_{IL(H)}$, a horizontal edge mask in mask table 480. Such entry in table 470 may also, perhaps implicitly, point to $Mask_{IL(V)}$, a vertical edge mask in mask table 480, because such vertical edge mask may be, for example, the entry in table 480 immediately following $Mask_{IL(H)}$. Thus, edge mask generator 220 may output from mask table 480 a horizontal edge mask that specifies the horizontal edges to be deblocked by filter portion 230 and a vertical edge mask that specifies the vertical edges to be deblocked by filter portion 230.

In some implementations (not shown), entries in mask table 480 may specify both horizontal and vertical edges to be filtered. For example, the "inner-left" entry in index table 470 may point to $Mask_{n\_IL\ (V\_H)}$, a combination vertical and horizontal edge mask for a given horizontal and vertical numbered edge n (n=0, ... 4; see FIGS. 3A and 3B, the numbered Hedge and Vedge values) in mask table 480. Thus, $Mask_{3\_IL\ (V\_H)}$, for example, may specify all horizontal edges to be deblocked along horizontal edge 3, as well as all vertical edges to be deblocked along vertical edge 3. Such entry in table 470 may also implicitly point to one or more additional $Mask_{n\_IL\ (V\_H)}$ values in table 480 for other numbered edges n. Other schemes and implementations are possible for mask table 480 that involve different numbers and arrangements of entries that those explicitly described herein. Thus, edge mask generator 220 may output from mask table 480 one or more edge masks that specify both horizontal and vertical edges to be deblocked by filter portion 230 for given numbered edges.

Although elements 470 and 480 may be described for the sake of convenience as "tables," they may be implemented as linked lists, a series of pointers, or any other suitable data structure. Further, in some implementations the edge masks $Mask_{XX}$ may be arranged within a single data structure in memory 460. For example, generator 450, the table index, and the macroblock position offset may be designed so that the resulting index value points to every second value in this structure to index both a horizontal edge mask and (implicitly) a vertical edge mask. Further, other implementations may involve a single edge mask that specifies both horizontal and vertical edges to be filtered within a macroblock. Alternately, more that two edge masks (e.g., horizontal and vertical) may be employed for a given macroblock. Other implementations are possible for edge mask generator 220 consistent with the disclosure herein.

Returning to FIG. 2, filter portion 230 may perform deblocking on horizontal and/or vertical edges between blocks in buffer 210 based on one or more edge masks from edge mask generator 220. For each edge designated by an edge mask for deblocking, filter portion 230 may affect up to about three samples on either side of the edge in question. The strength of the filtering applied by filter portion 230 may depend on, for example, the current quantizer, the coding modes of neighboring blocks, and/or the gradient of the samples across the edge. Such factors and their application to deblocking are generally known, and will not be further explained here.

In some implementations, filter portion 230 may read all or most of the samples to be filtered from buffer 210. Filter portion 230 may perform a corresponding writing operation of filtered samples to buffer 210 after deblocking is performed. In some implementations, however, filter portion 230 may perform deblocking read-and-replace operations to/from buffer 210 on a per-edge basis.

Figure 6:
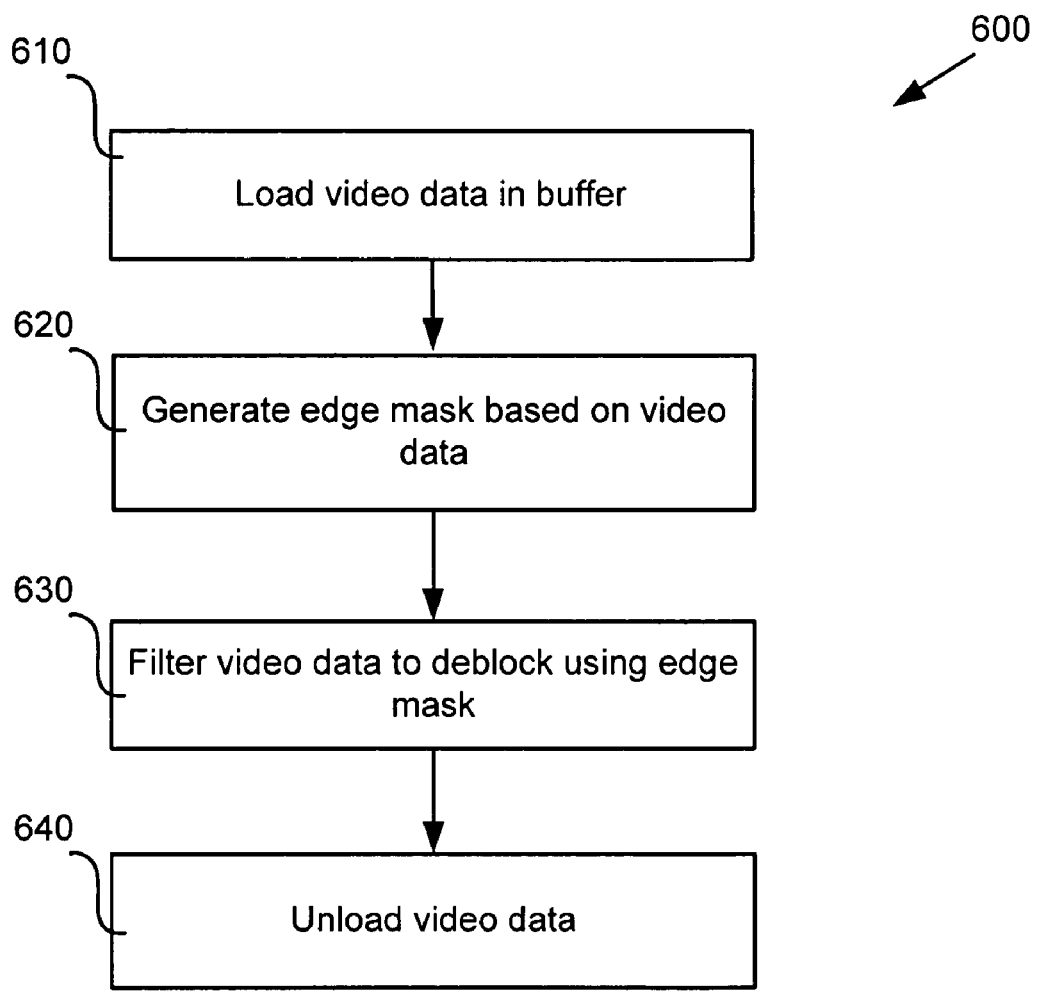
FIG. 6 illustrates an exemplary process of deblocking video data.

FIG. 6 illustrates an example process 600 of deblocking video data. Although FIG. 6 may be described with regard to deblocking filter 130 in FIG. 2 for ease and clarity of explanation, it should be understood that process 600 may be performed by other filters.

Processing may begin by loading video data in buffer 210 [act 610]. As explained previously, buffer 210 may hold more or less than one macroblock of video data. Buffer 210 may also store, at various times, luminance and/or chrominance video data.

Based on the type of video data in buffer 210, edge mask generator 220 may generate one or more edge masks that specify the edges between blocks in buffer 210 to be deblocked [act 620]. For example, logic (e.g., elements 410-440) may specify a particular table 470 in which to look for edges to be filtered. Other logic (e.g., combiner 450) may use information from a macroblock in buffer 210 to specify a position within the table 470 where the edges are further specified. In some implementations, generator 220 may produce separate masks for horizontal edges and vertical edges to be deblock-filtered. In some implementations, however, generator 220 may produce a single mask that identifies both horizontal and vertical edges.

Processing may continue with filter portion 230 deblock-filtering the video data in buffer 210 based on one or more edge masks from generator 220 [act 630]. The order of such processing may largely depend on the data loaded in buffer 210, and may follow certain conventions, such as processing luminance data before chrominance data. Other conventions may also be followed, such as deblock-filtering horizontal edges before vertical edges, or deblock-filtering vertical edges before horizontal edges. After video data is filtered, it may be written to buffer 210, possibly replacing corresponding unfiltered data.

After all filtering has been performed on data in buffer 210, such data may be unloaded to the next destination in its processing chain [act 640]. As alluded to previously, such next destination may vary depending on whether filter 130 is located in a decoder or an encoder. In some implementations, buffer 210 may be sequentially unloaded as data is deblocked, and new data may be written to buffer 210 [act 610] as the filtered data is removed. In some implementations, act 640 may occur only after all data in buffer 210 has been processed by filter portion 230 (e.g., when the data in buffer 210 has been completely deblocked).

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although described as discrete functional units, the elements of FIGS. 2 and 4 may be implemented in any combination of hardware and/or firmware (e.g., in register transfer logic (RTL) or similar design schemes). Further, the acts in FIG. 6 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. An apparatus, comprising:
   a memory including a plurality of tables that include edge mask information that identifies edges of blocks of video data to be deblock filtered;
   first logic to determine whether data to be deblock filtered is luminance or chrominance data and to specify a table index for selecting one table of edge mask information among the plurality of tables based at least in part on whether the video data to be deblock filtered is luminance or chrominance data; and
   a combiner to combine the table index with a macroblock position offset, the macroblock position offset indicating a particular macroblock region in the video data to be deblock filtered, to produce a combined index to specify a particular data entry within the one table, the particular entry corresponding to at least one set of edge mask information used to deblock filter the video data.

2. The apparatus of claim 1, wherein the first logic includes:
   a multiplexer that outputs the table index based on whether video data to be deblock filtered is luminance data or chrominance data.

3. The apparatus of claim 1, wherein the first logic includes:
   a multiplexer that outputs the table index based on whether video data to be deblock filtered is in-loop data or overlapping data.

4. The apparatus of claim 1, wherein the particular entry within the one table includes a pointer to the at least one set of edge mask information.

5. The apparatus of claim 4, wherein the at least one set of edge mask information includes a horizontal edge mask and a vertical edge mask.

6. The apparatus of claim 1, further comprising:
   an index memory connected to the first logic and including a plurality of indices into the memory including the plurality of tables.

7. A method, comprising:
   loading video data into a buffer, the video data including a number of neighboring blocks;
   detecting whether the video data is luminance or chrominance data;
   selecting, using a logic device, a first index from a number of stored indices based on whether the video data is luminance data or chrominance data, wherein the first index specifies one table from a plurality of tables having edge mask information;
   combining the first index with a macroblock position offset obtained from the video data to produce a combined index that specifies a particular data entry within the one table corresponding to a set of edge mask information;
   generating at least one edge mask based on the set of edge mask information; and
   filtering the video data in the buffer to deblock edges between blocks that are identified by the at least one edge mask.

8. The method of claim 7, further comprising:
   unloading the video data from the buffer after the filtering.

9. The method of claim 7, wherein the selecting includes:
   selecting the first index based on a presence of an in-loop flag or an overlap flag in the video data.

10. The method of claim 7, wherein the generating includes:
    looking up a horizontal edge mask and a vertical edge mask using the combined index.

* * * * *